United States Patent [19]
Rhoads et al.

[11] 3,861,378
[45] Jan. 21, 1975

[54] REVERSIBLE AIR FLOW OVEN

[75] Inventors: Delmar Dean Rhoads; Robert H. MacKay, both of Fort Wayne, Ind.; Gary W. Krimmel, Barrington, Ill.; Victor A. Canevello, Beltsville, Md.

[73] Assignee: Lincoln Manufacturing Company, Inc., Fort Wayne, Ind.

[22] Filed: Aug. 27, 1969

[21] Appl. No.: 853,339

[52] U.S. Cl. .............................. 126/21 A, 219/400
[51] Int. Cl. ............................................. A21b 1/06
[58] Field of Search .................. 165/39, 30, 12, 97; 126/21 A, 369; 219/400, 413, 492; 34/216, 233; 432/162

[56] References Cited
UNITED STATES PATENTS

| | | | |
|---|---|---|---|
| 616,293 | 12/1898 | Davidson | 34/216 |
| 1,323,416 | 12/1919 | Simpson | 34/233 |
| 1,470,653 | 10/1923 | Sullivan | 34/233 |
| 2,617,005 | 11/1952 | Jorgensen | 126/374 |
| 3,261,343 | 7/1966 | Tibell | 219/400 |
| 3,304,071 | 2/1967 | Gentry | 432/162 |
| 3,385,288 | 5/1968 | Lohr et al. | 126/379 |
| 3,475,151 | 10/1969 | Briggs et al. | 165/97 |

*Primary Examiner*—Manuel A. Antonakas
*Attorney, Agent, or Firm*—Albert L. Jeffers; Roger M. Rickert

[57] ABSTRACT

An oven for warming pre-packaged foods is disclosed having a removable bottom portion on which the foods may be stacked in baskets so that warm air may flow across and around the individual packages when the bottom is inserted in the oven. The oven has an upper plenum portion containing a heater element and a fan which forces air across the heater elements down through one of the sides of the oven through a tapered duct and outwardly through a diffuser panel into the oven. Part of the air re-enters the plenum portion in the center and part of it passes through a second diffuser panel back up a second tapered duct and back into the plenum portion. Provision is also made for periodically reversing the direction of air flow to provide a more uniform heating of the food product.

6 Claims, 9 Drawing Figures

Patented Jan. 21, 1975

INVENTORS
VICTOR A. CANEVELLO
GARY W. KRIMMEL
DELMAR D. RHOADS
ROBERT H. MACKAY by JEFFERS & YOUNG
Attorneys Patented Jan. 21, 1975

REVERSIBLE AIR FLOW OVEN

BACKGROUND OF THE INVENTION

This invention relates to an oven and could have utility in any environment where it is required to heat a product. The inventionn finds particular utility in the warming or reconstituting of pre-packaged foods directly prior to serving. The loading and unloading of prior art ovens is both time consuming and awkward. Prior art ovens suffer from the additional defect that the heating is not uniform through out the oven often resulting in some of the food products being overly done while others are not adequately warmed for consumption.

SUMMARY OF THE INVENTION

An oven is provided according to the teachings of the present invention which has a rollably removable floor portion which floor portion provides support for the product to be heated as well as providing the bottom closure for the oven. Thus the bottom portion of the present invention may be rolled out from under the remaining portion of the oven structure and a series of baskets containing the food product stacked upon this bottom portion. This bottom is then rolled back into the oven and the door closed for heating. Two or more floors may be provided for a single oven so that a second floor or bottom portion is stacked ready for insertion while the first is in the oven heating. This provides an obvious saving of time and may be extremely significant where a large number of people are to be served in a short period of time. The present invention provides for a far more uniform heating of the items within the oven by providing diffuser panels on each side of the oven interior which cause the forced air to be evenly distributed over the product. This uniformity is further enhanced by providing a tapered duct work connecting with the diffuser panels so that the air velocity at the bottom of the oven is comparable to that at the top. The present invention further enhances uniformity of heating by providing for periodic reversals of the direction of air flow within the oven.

Accordingly, it is one object of the present invention to provide an oven for warming pre-packaged foods which is much more readily loaded and unloaded than the prior art ovens.

It is another object of the present invention to provide an oven for warming a product which provides a much more uniform heating throughout the oven space than was heretofore possible.

It is another object of the present invention to provide a forced air oven having a provision for periodically reversing the direction of air flow to enhance the uniformity of heating within the oven.

It is a still further object of the present invention to provide an oven having a portable base or bottom portion which may be preloaded prior to insertion in the oven.

The present invention contemplates a safety switch which prevents the oven from being energized when the base portion is removed from the oven. The present invention contemplates a further safety feature by providing two thermostatic controls, one of which is effective to regulate the oven temmperature and the other of which is effective to de-energize the oven in the event that the oven temperature exceeds a predetermined maximum.

Accordingly, it is a further object of the present invention to provide an oven having enhanced safety features.

These and other objects and advantages of the present invention will be more readily understood from the following detailed description of a preferred embodiment read in conjunction with the drawings in which:

DESCRIPTION OF THE PREFERRED EMBODIMENT

Figures 1, 9:
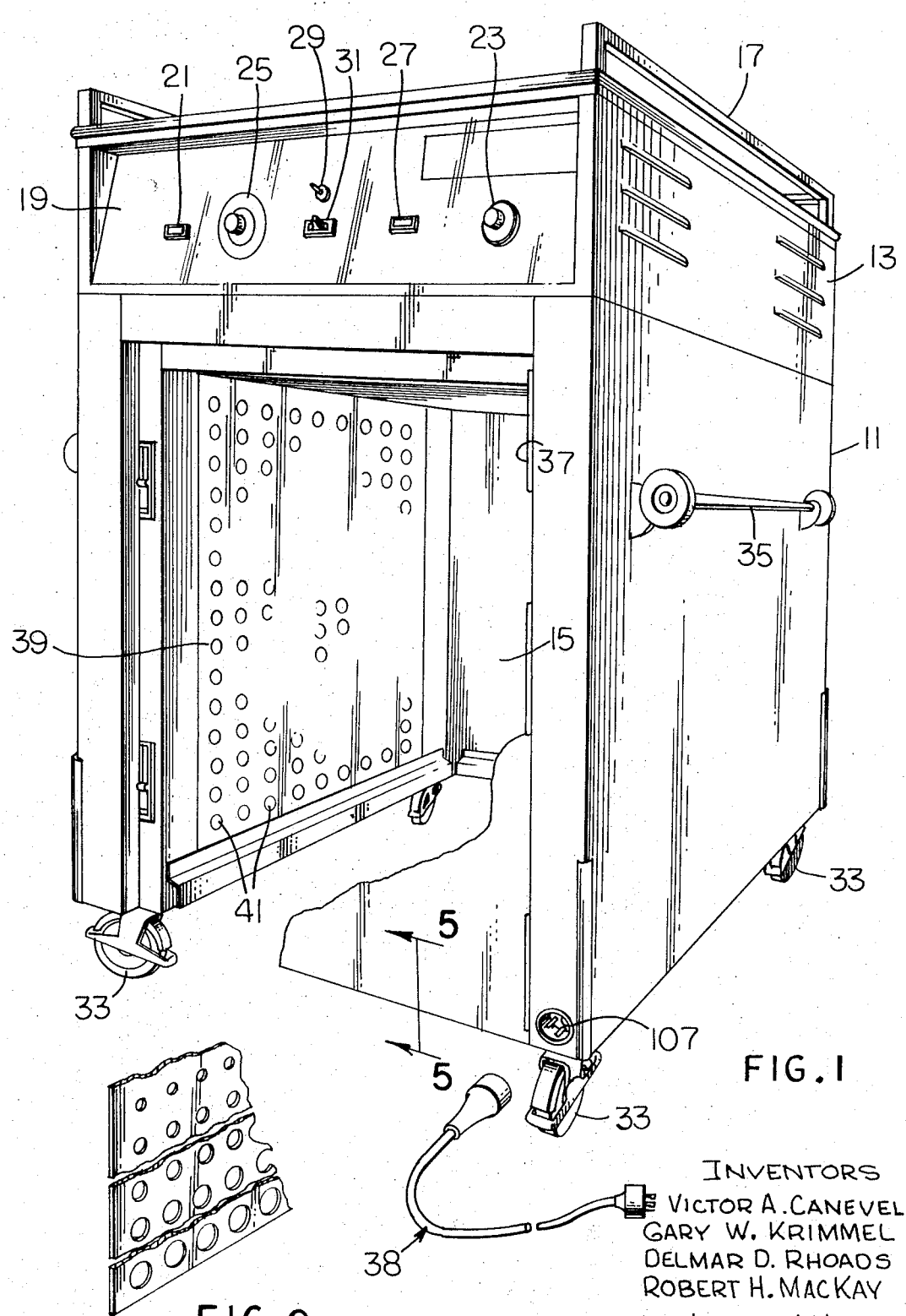
FIG. 1 is a perspective view of the oven with the bottom and door removed.
FIG. 9 shows an alternative arrangement for the baffle holes.

Referring first to FIG. 1, the exterior configuration of the oven is clearly illustrated. The oven consists generally of an exterior housing 11 having an upper plenum portion 13 and an interior or product containing portion 15. The exterior top portion of the plenum is provided with retaining rails 17 so as to allow the stacking of trays or other items on top of the oven. The exterior front portion of the plenum is provided with a control panel 19 having a main power indicator 21, a heat selector 23, a timer indicating the lapsed time 25 and a red indicator light 27 which is energized when the heaters of the oven are energized. The control panel also includes a double pole-single throw switch 31 which is effective to bypass the timer. The timer 25 is further provided with a buzzer which indicates the prescribed time has elapsed and this buzzer is de-energized by the toggle switch 29. The oven structure is supported on casters 33 so that it may be readily moved and handles 35 are provided on each side to facilitate such moving. The line 38 supplying power to the oven is pluggably removable from either the wall socket or from the oven to further enhance the mobility and versatility of the structure.

FIG. 1 illustrates the oven with the bottom portion removed and with the door which is normally supported on hinges 37 also removed. One of the diffuser plates 39 may be readily seen to consist of a series of apertures 41 which in this embodiment are of uniform cross sectional area but may be of variable cross sectional area as shown in FIG. 9, and may have a configuration which is other than circular.

Figure 2:
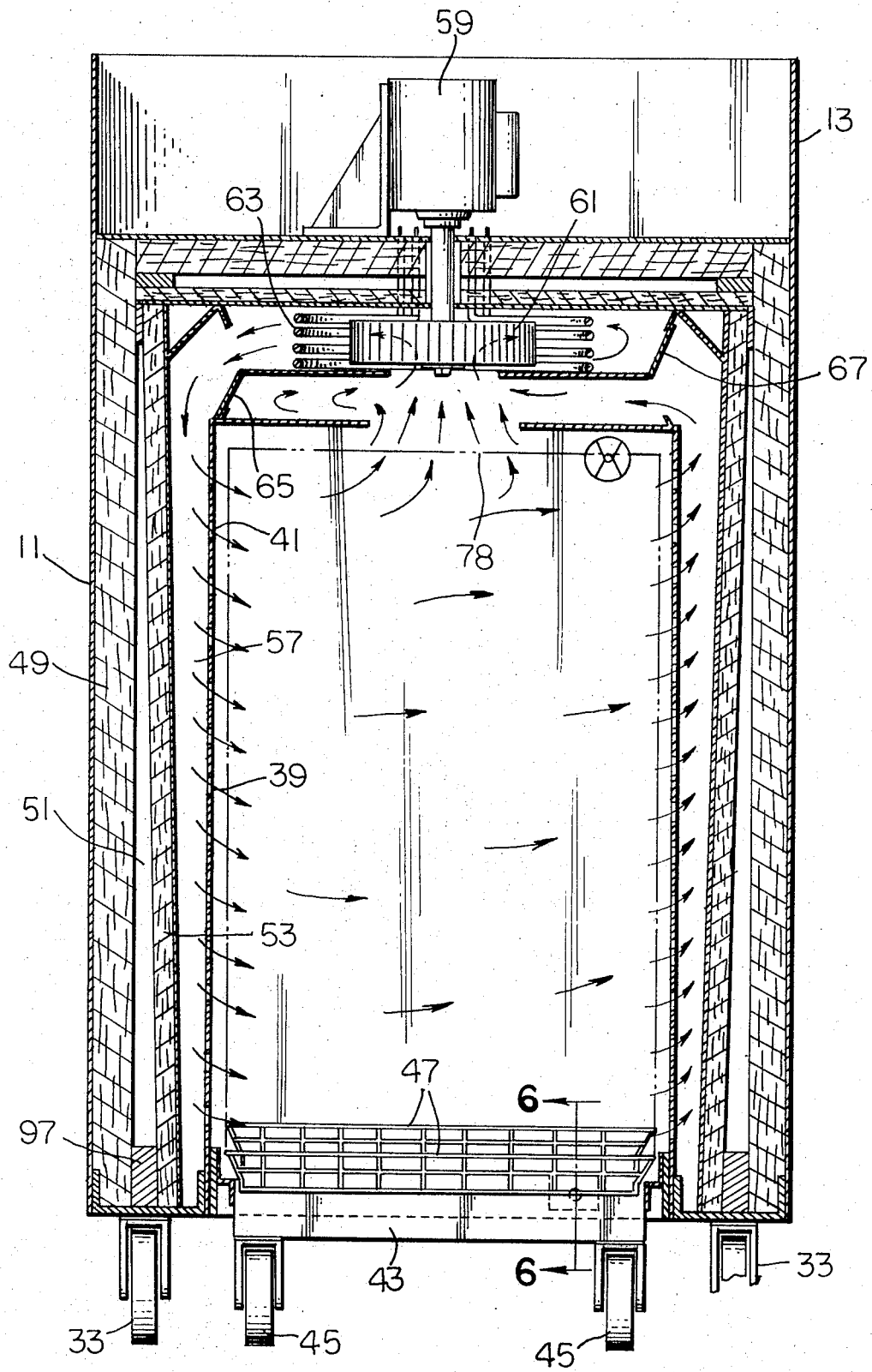
FIG. 2 is a cross sectional view of the oven showing the bottom including food racks in position.

FIG. 2 shows a front cross sectional view of the oven with the insulated portable base or bottom portion 43 in place. This bottom portion is seen to consist of a cart supported on four rollers or casters 45 so that it is readily removable from the oven. The bottom portion also serves as support for the product containing baskets or racks 47. A slide arrangement for pan or tray supports could also be used. Thus, the bottom portion and the racks and any product contained therein are rollably removable from the oven. The oven walls are seen to consist of an exterior housing or shell portion 11 enclosing a first layer of insulation material 49, an air space 51, and a second layer of insulation material 53. The outer layer of insulation material may be provided with a layer of aluminum foil or other reflective material 55 as is more clearly shown in FIG. 7. For reasons which will appear subsequently, it is desirable to have the duct 57 tapered and accordingly in the embodiment shown the air gap 51 is tapered in the revese direction to accomplish this. It should be apparent that the air gap 51 could be of uniform thickness and any of several vertical walls inclined somewhat to accomplish this same tapering effect in the duct 57.

The plenum portion 13 is seen to contain a motor 59 which drives a fan 61 to circulate the air within the oven up through the fan and outwardly past the heating or cooling coils 63 down the tapered duct 57 and out through the apertures 41 in the diffuser panel 39. The air return path is through similar apertures in the other diffuser panel back up a similar tapered duct and back into the center portion of the fan 61. There is also an air return path through the center of the top of the oven to the center of the fan. As will appear more clearly with respect to the discussion of FIG. 3, the flaps 65 and 67 are simultaneously movable to new positions so as to reverse the direction of air flow through the food containing portion of the oven. Thus, when properly energized the flap 65 moves in an upwardly direction to block the air flow path toward the center of the fan. At the same time, the flap 67 drops down to block the air flow path to the center of the fan while simultaneously opening an air flow path from the fan outwardly past the heating coils and down the tapered duct work.

Figure 3:
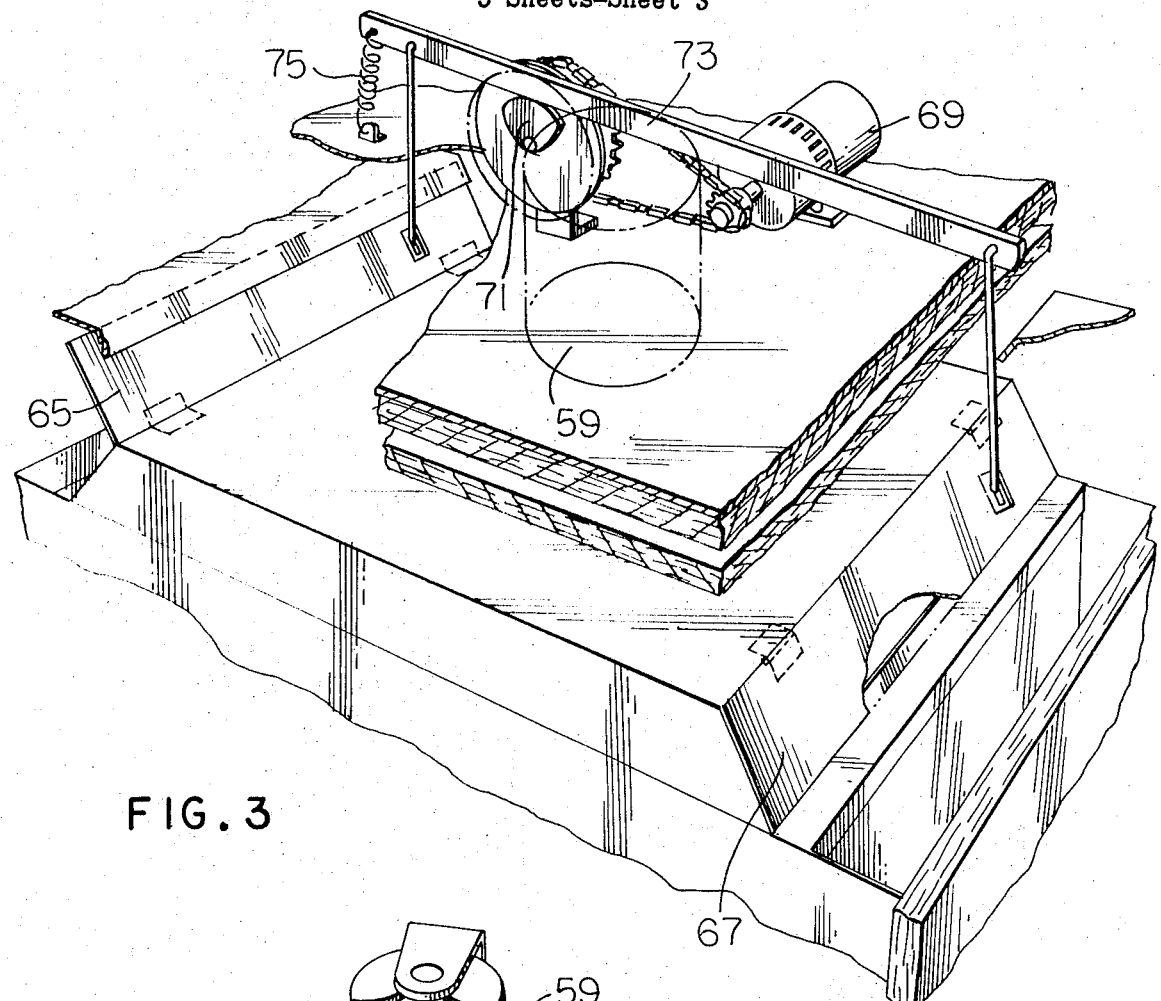
FIG. 3 is a cut away perspective view of the plenum portion of the oven particularly illustrating the air flow reversal mechanism.

FIG. 3 shows a motor 69 driving a cam 71 which is effective during half of its revolution to hold the lever arm 73 in the position shown and during the other half of its revolution to force the flap 65 down while simultaneously raising the flap 67. Thus, the mechanism of FIG. 3 having its motor 69 continuously running effectively hold one flap in an up position and the other in a down position for a period of time, which in one preferred embodiment was about one minute, and then rapidly reverses this situation so that the flap that was up is now down and the previously down flap is now up. A spring 75 assures that the lever arm 73 will faithfully follow the contour of the cam 71. This lever arm 73 is pivoted about and supported at a point at its center.

Figure 4:
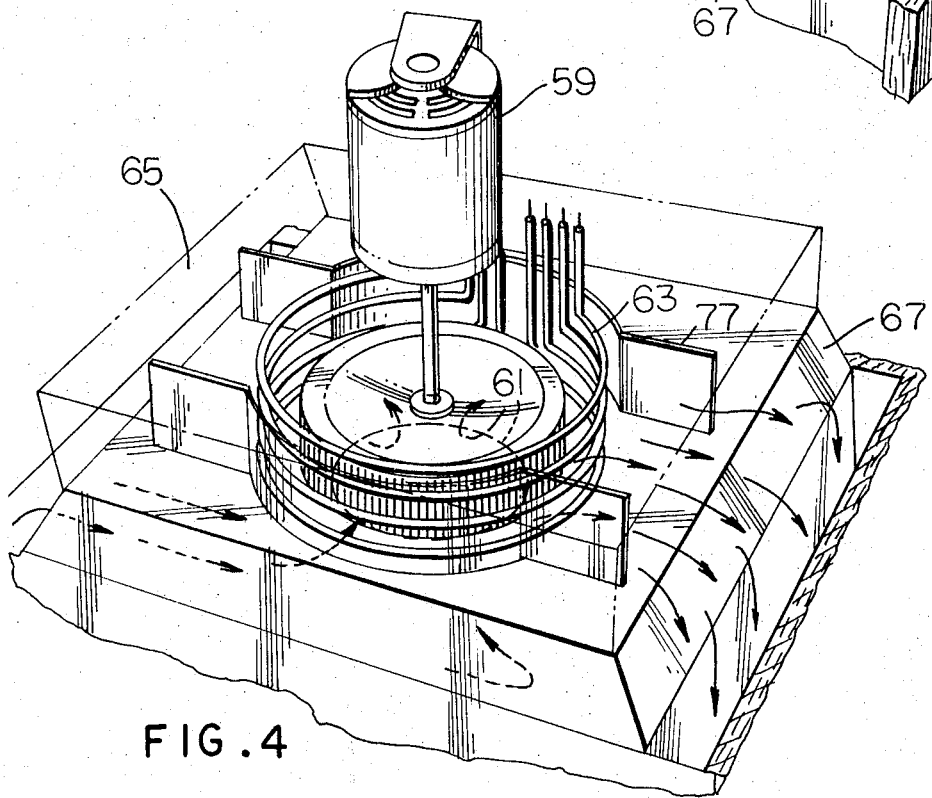
FIG. 4 is a cut away view of the plenum showing the heating or cooling elements and the air circulating fan.

The path of air flow is clearly shown in FIG. 4 where the motor 59 drives the fan 61 so as to force air up through the center of the fan and outwardly past the heating coils 63. The heating coils and fan are partially surrounded by a shroud 77 which causes the air flow to be toward the right with the flaps in the position shown or toward the left if the flaps 65 and 67 reverse their positions but in any event prevents the air flow from being a general radial dispersion of the warmed air. Thus, it is clear that when flap 67 is in its position as shown in FIGS. 3 and 4 air is drawn up through the center of the fan 61 and forced out to the right of the drawing and down the right hand tapered duct of FIG. 2. In the alternative, when the cam 71 of FIG. 3 is revolved one half turn from the position shown, the flap 67 is in its up position and air flow in FIG. 4 is up through the center of the fan and out toward the left of that drawing. This air flow direction would then be that shown in FIG. 2. An air return vent or series of vents 78 may also be provided which allows part of the air to return by way of the center of the oven for either direction of air flow.

Figure 5:
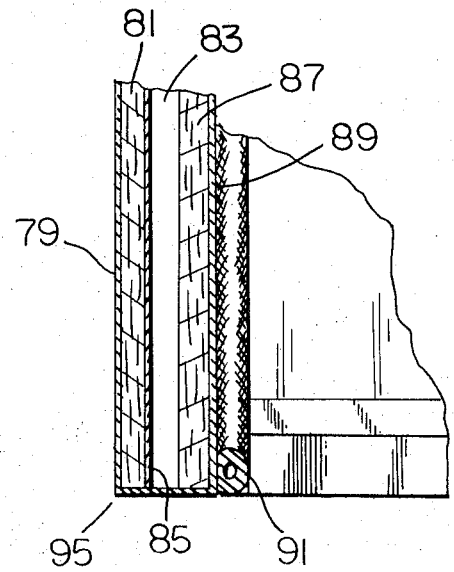
FIG. 5 is a cross sectional view along the line 5—5 of FIG. 1.

Turning now to FIG. 5, the details of the insulation and sealing of the door for the oven are shown wherein the door consists of an outer wall 79, a first layer of insulation 81, an air space 83, faced by a reflective layer such as aluminum foil 85, a second layer of insulation 87, and an inner wall 89. An air tight seal between the door and the body of the oven is assured by a deformable member 91 such as an asbestos rope which deforms and seals when the door is closed. This deformable member as shown in the drawing assures that the door will seal with the cart or bottom portion 43; however, such a deformable member is also used to seal the body of the oven and the door as shown in FIG. 7.

Figure 7:
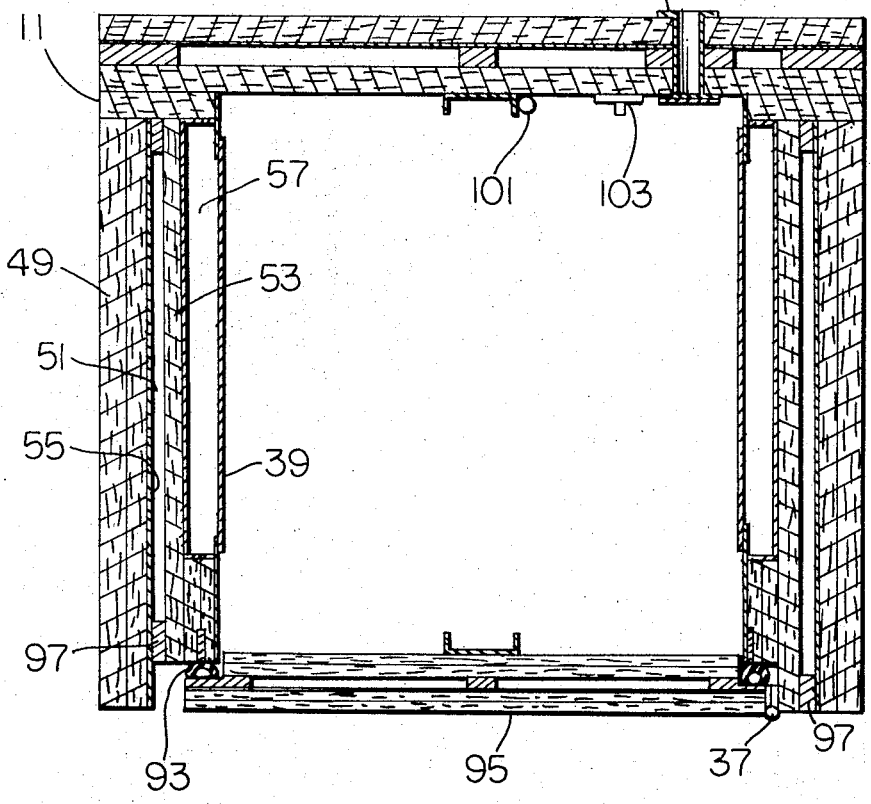
FIG. 7 is a top cross sectional view of the food containing portion of the oven.

In FIG. 7 that deformable member is shown as 93 and is permanently affixed to the door 95 although it could equally well be permanently affixed to the body of the oven.

As was noted earlier regarding FIG. 2, the side wall insulation of the present invention consists of an exterior wall 11, a first layer of insulation 49, a reflective surface such as aluminum foil 55, an air gap 51, a second layer of insulation 53 all of which are outside of the air passageway or duct 57 and the diffuser panel or grille 39. Both FIGS. 7 and 2 show spacers 97 which maintain in separation the two layers of insulation 49 and 53. Similar multilayer insulation may be utilized in the back, top and removable base portions of the present invention. FIG. 7 further illustrates an optional vent 99 one of the temperature probes 101 and a safety switch 103, the function of which may be more clearly seen in FIG. 6.

Figure 6:
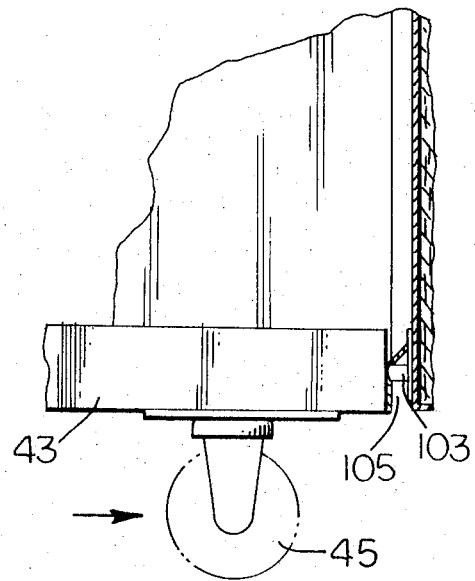
FIG. 6 is a cross sectional view along the line 6—6 of FIG. 2.

In FIG. 6, the cart 43 which is movable on casters 45 is shown in position within the oven. When this cart is in the proper position for heating a cart load of food or other material, the back of the cart engages the safety switch 103 allowing the oven to be energized. When the cart is withdrawn from the oven safety switch 103 is effective to de-energize the oven. A seal 105 is also provided similar in nature to the seals 91 and 93 so as to assure a reasonably air tight and well insulated oven.

Figure 8:
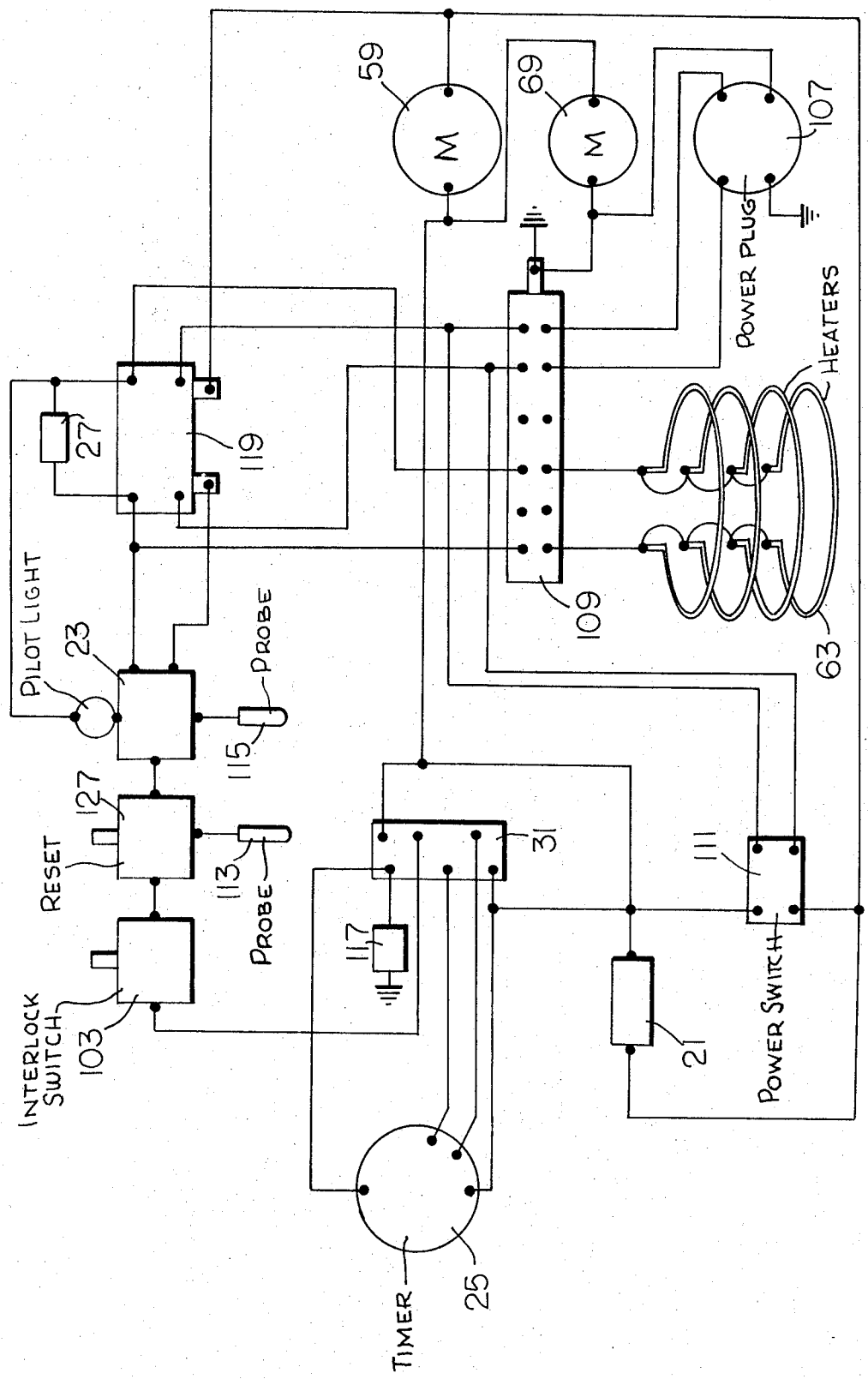
FIG. 8 is a wiring diagram of the heating and control elements of the oven.

Turning now to FIG. 8 which shows an electrical wiring diagram for the present invention, we find many of the earlier mentioned elements in diagrammatic representation. Thus, several elements of FIG. 8 are also shown on the control panel of FIG. 1. The timer 25, the white indicator light 21 showing that the oven is energized, the pilot light 27 indicating the heater elements of the oven to be energized, the timer bypass switch 31, and the adjustable thermostatic control 23 are all shown in both Figures. For simplicity, the switch 29 which de-energized the buzzer 117 has not been shown in FIG. 8. Other elements of FIG. 8 which have been discussed earlier include the main or fan motor 59 also illustrated in FIG. 4, the auxiliary motor which serves to operate the cam which is effective to reverse the direction of air flow is represented as 69 in FIG. 3 as well as in FIG. 8, and the source of electrical power represented as the power plug 107 as was earlier shown in FIG. 1. FIG. 7 illustrated at 101 a possible positioning of the temperature probe; however, in one preferred embodiment two probes 113, 115 are employed.

Electrical energy enters the system by way of the power plug 107 which feeds energy by way of the terminal board 109 to one set of contacts in the relay or contactor 119. This same source of energy from the terminal board 109 also leads to the main on-off switch 111 which, when closed, energizes the panel indicator light 21 as well as the rest of the system. The relay 119 when energized causes power to be delivered to the "heater on" indicator lamp 27 as well as directly to the heaters 63 again by way of the terminal board 109. This relay is energized by a rather circuitous series circuit beginning at the lower left hand terminal of the power switch coming around to one terminal of the energizing coils of the relay 119 to the thermostatic control 23, the emergency thermostatic control 127, the interlock switch 103 and the timer 25 back to the other side of the power switch. Thus, it should be clear that any time any one of the elements 25, 103, 127, or 23 presents an open circuit, this series connection is broken and the relay 119 fails to provide current to the heater 63. Thus, when the temperature probe 115 indicates that the oven temperature exceeds that specified by the heat selector 23 this element opens and shuts off the heater elements. Similarly, when the safety thermostatic probe 113 indicates that the oven has exceeded a predetermined maximum temperature, the resettable disconnect switch 127 opens again de-energizing the heater coils. In a similar fashion, if the bottom of the oven is removed the interlock switch 103 opens and serves to shut off the power to the heater elements. Similarly, when the time prescribed by the user of the oven has expired, the timer 25 serves to open this series circuit and de-energize the oven heaters.

Thus, while the present invention has been described with respect to a specific embodiment various modifications will suggest themselves to those having ordinary skill in the art. The present inventive combination embodies numerous novel subcombinations, for example, the present oven might be constructed without the provision for reversing the direction of air flow and instead might rely upon air flow down both of the side ducts and back up through the center portion of the oven in a symmetric fashion. Similarly, the bottom portion could be fixed within the oven and most any type of support such as racks, pans or trays could be utilized. The present discussion has been directed to a warming oven but it is obvious that this device could be utilized in baking, roasting and other cooking operations as well as for refrigeration purposes. To form a refrigerator out of the present structure, one could merely substitute the cooling coils of a refrigeration unit for the heating coils 63. Also, a fairly uniform heat flow can be achieved by making the ducts straight rather than tapered and utilizing the apertures of varying cross section in the diffuser panels. Also, the heater coils 63 could be arranged in a staggered configuration for a more efficient heat transfer. It is also possible to elevate the specific heat and thus make the oven more efficient by spraying water into the oven cavity. These modifications are illustrative of those possible and the scope of the present invention is to be measured only by that of the appended claims.

I claim:

1. In a forced air oven the improvement comprising: means for reversing periodically the direction of air flow past a product to be heated; and
means for maintaining uniform the quantity of air flowing at different levels within the oven comprising duct means and diffuser means, said diffuser means comprising a plurality of plates having a plurality of apertures therein said apertures being of increased cross sectional area at progressively lower levels within the oven and said duct means comprising a plurality of ducts each communicating with a single plenum, said ducts being of diminishing cross sectional area at progressively lower levels within the oven.

2. An oven for heating a food product having a top portion and walls forming a heating space provided with a bottom opening for receiving the food product, closure means for enclosing the bottom opening, heating means disposed within said oven to heat the air in the heating space, means for circulating the flow of heated air through the heating space, and means for reversing periodically the direction of the air flow.

3. An oven for heating a food product having a top portion and side walls forming a food product containing portion, a removable lower portion adapted to support all of the food product within the food product containing portion independent of the top portion and side walls of the oven, closure means for the opening, a heater contained in said oven for heating the air therein, means to circulate the heated air within said oven, and means for periodically reversing the direction of air flow through the product containing portion.

4. An oven for heating a food product having a food product containing portion, a heat transfer means, a removable lower portion for simultaneously supporting a food product and positioned to close the bottom of the food product containing portion, a blower disposed to circulate air past the heat transfer means, air duct means for conducting the heated air from said blower to the food product containing portion and means for periodically reversing the direction of air flow through the product containing portion.

5. The forced air device of claim 4 further comprising diffuser means connecting said air duct means with said product containing portion, said diffuser means having a plurality of apertures therein for making more uniform the air flow at various points in said product containing portion.

6. An oven in accordance with claim 5 wherein a safety switch is positioned within said oven so as to be effective to energize said oven only when said cart is positioned in said oven to close the bottom portion of the opening.

* * * * *